(12) United States Patent
Lau et al.

(10) Patent No.: US 7,313,092 B2
(45) Date of Patent: Dec. 25, 2007

(54) APPARATUS AND METHOD FOR AN OVERLOAD CONTROL PROCEDURE AGAINST DENIAL OF SERVICE ATTACK

(75) Inventors: Wing Cheong Lau, Mlddletown, NJ (US); Yinglu Zhang, Woodbridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1074 days.

(21) Appl. No.: 10/261,299

(22) Filed: Sep. 30, 2002

(65) Prior Publication Data
US 2004/0062199 A1 Apr. 1, 2004

(51) Int. Cl.
*H04L 12/22* (2006.01)
*G06F 11/00* (2006.01)

(52) U.S. Cl. .................. 370/230; 370/235; 709/225; 726/22

(58) Field of Classification Search ............. None
See application file for complete search history.

(56) References Cited

U.S. PATENT DOCUMENTS

| | | | | |
|---|---|---|---|---|
| 6,301,668 B1 * | 10/2001 | Gleichauf et al. | ............ | 726/25 |
| 6,484,203 B1 * | 11/2002 | Porras et al. | ............... | 709/224 |
| 6,499,107 B1 * | 12/2002 | Gleichauf et al. | ............ | 726/23 |
| 2005/0111307 A1 * | 5/2005 | Saaski et al. | ............... | 368/314 |

OTHER PUBLICATIONS

J. Kaufmann, "A New Traffic Overload Control for the Autoplex Series II Cell—Work Project No. 170211-2200", Technical Memorandum, Bell Labs. Lucent Technologies, Feb. 25, 1999.

(Continued)

*Primary Examiner*—Chi Pham
*Assistant Examiner*—Soon D. Hyun
(74) *Attorney, Agent, or Firm*—Matthew J. Hodulik

(57) ABSTRACT

The present invention is a methodology to prioritize packets based on the conditional probability that given the values of attributes carried by packet, the packet is a legitimate one. We will call this the conditional legitimate probability of a packet from here onward. The conditional probability of each packet is evaluated based on Bayesian estimation technique. This is accomplished by comparing the attributes carried by an incoming packet against the "nominal" distribution of attributes of legitimate packet stream. Since an exact prioritization of packets based on their conditional legitimate probability would require offline, multiple-pass operations, e.g. sorting, we take the following alternative approach to realize an online, one-pass selectively dropping scheme. In particular, we maintain the cumulative distribution function (CDF) of the conditional legitimate probability of all incoming packets and apply a threshold-based selective dropping mechanism according to the conditional probability value computed for each incoming packet. To speed-up the computation of the conditional legitimate probability for each incoming packet, we may, as an alternative, use the logarithmic version of the equation to implement the Bayesian estimation process. Other features of the invention include: providing means to guarantee minimum throughput of particular (pre-configured) type(s) of packets; providing a. Filtering Mechanism to suppress the noise during estimation/maintenance of nominal attributes distribution; applying state-of-the-art efficient algorithm/data-structures for quantile and histogram building/updates; using the proven, industrial-strength load-shedding algorithms as a submodule in the overload control algorithm; and being amenable to practical implementation to support online, one-pass processing on high-speed communication links.

15 Claims, 7 Drawing Sheets

OTHER PUBLICATIONS

G. S. Manku et al., "Approximate Medians and Other Qauntiles in One Pass And With Limited Memory", *Proc. of SIGMOD'98*, Seattle, WA., U.S.A., 1998.

G. S. Manku et al., "Random Sampling Techniques for Space Efficient Online Computation of Order Statistics of large Datasets", *Proc. of SIGMOD'99*, Philadelphia, PA., U.S.A. , 1999.

G. S. Manku, "Approximate Frequency Counts Over Data Streams", *Proc. of the 28th VLDB Conference*, Hong Kong, China, Aug. 2002.

M. Greenwald et al., "Space-Efficient Online Computation of Quantile Summaries", *Proc. of the 2001 ACM SIGMOD Intl. Conference on Management of Data*, Santa Barbara, CA., May 2001, pp. 58-66.

R. M. Karp et al., "A Simple Algorithm for Finding Frequent Elements in Streams and Bags", manuscript available from: http://www.cs.berkeley.edu/~christos/icebergs.ps.

Jaeyeon Jung et al., "Flash Crowds and Denial of Service Attacks: Characterization and Implications for CDNs and Web Sites", *Proc. of WWW2002*, May 2002, Honolulu Hawaii, U.S.A.

P. Domingos et al., "Mining High-Speed Data Streams", *Proceedings of the Sixth International Conference on Knowledge Discovery and Data Mining*, 2000, Boston, MA, ACM Press, pp. 71-80.

G. Hulten et al., "Mining Time-Changing Data Streams", *Proceedings of the Seventh International Conference on Knowledge Discovery and Data Mining*, San Francisco, CA: 2001: ACM Press, pp. 97-106.

Tingfang Ji, "Adaptive Nonlinear Suppression of Non-Gaussian Interface" preprint, 2002.

M. Datar et al., "Maintaining Stream Statistics Over Sliding Windows", *Proc. of Thirteenth Annual ACM-SIAM Symposium On Discrete Algorithms (SODA'02)* 2002.

B. Babcock et al., "Sliding Window Computations Over Data Streams", Technical Report, Department of Computer Science, Standord University, Apr. 2002.

Fei Chen et al., "Incremental Quantile Estimation For Massive Tracking", *Proc. of the Sixth International Conference in Knowledge Discovery and Data Mining*, 2000.

Anna C. Gilbert et al., "How To Summarize The Universe: Dynamic Maintainance of Quantiles", *Proc. of the 28th VLDB Conference*, Hong Kong, China, Aug. 2002.

\* cited by examiner

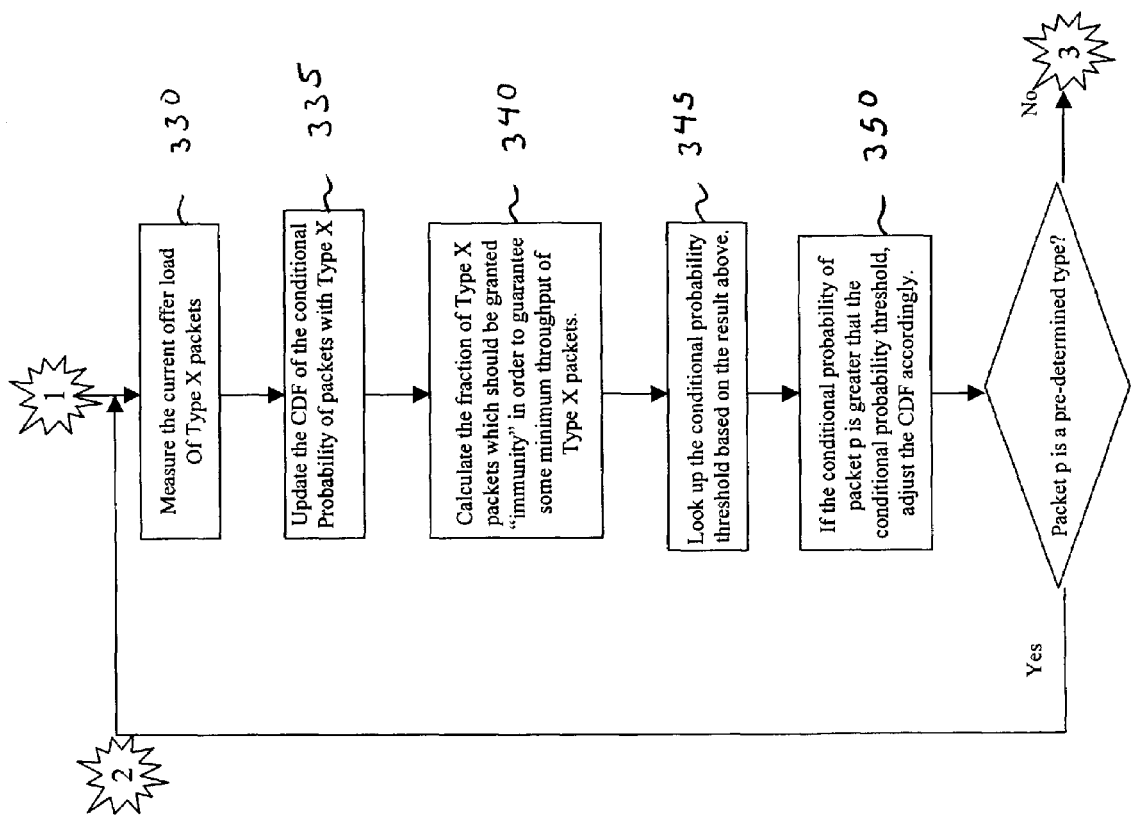

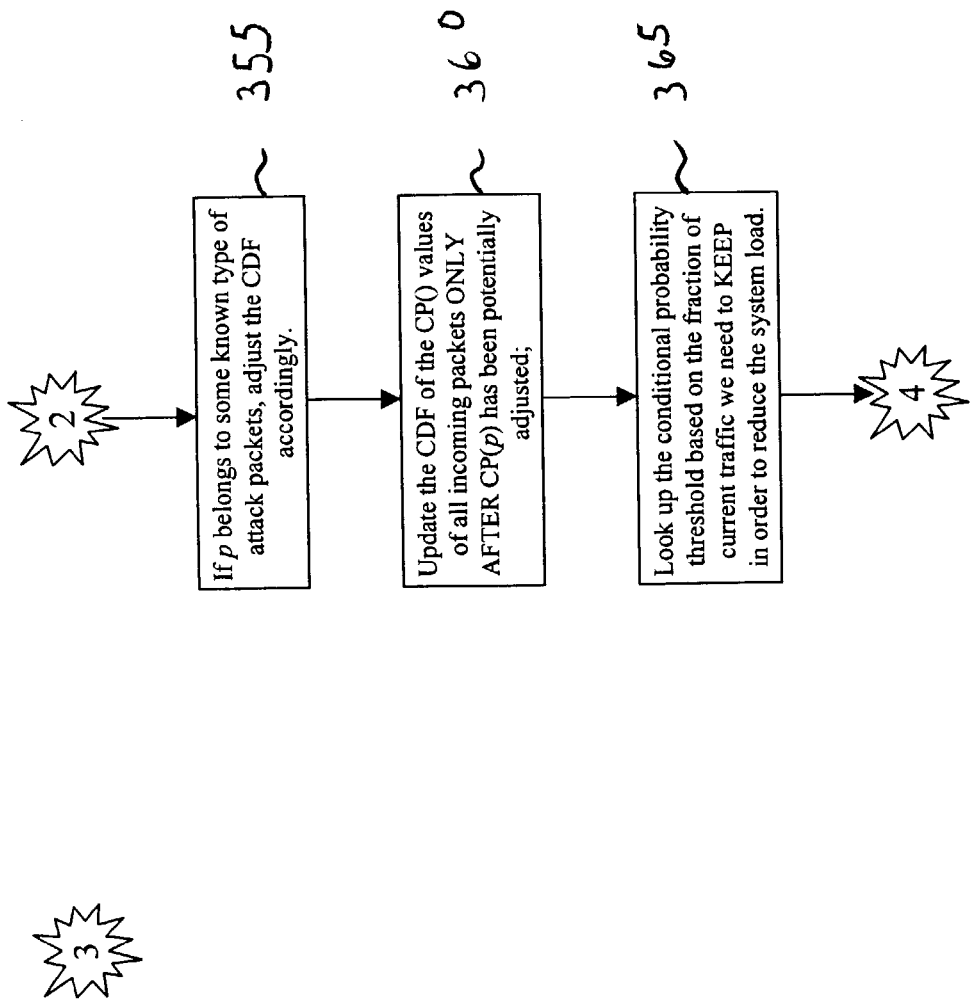

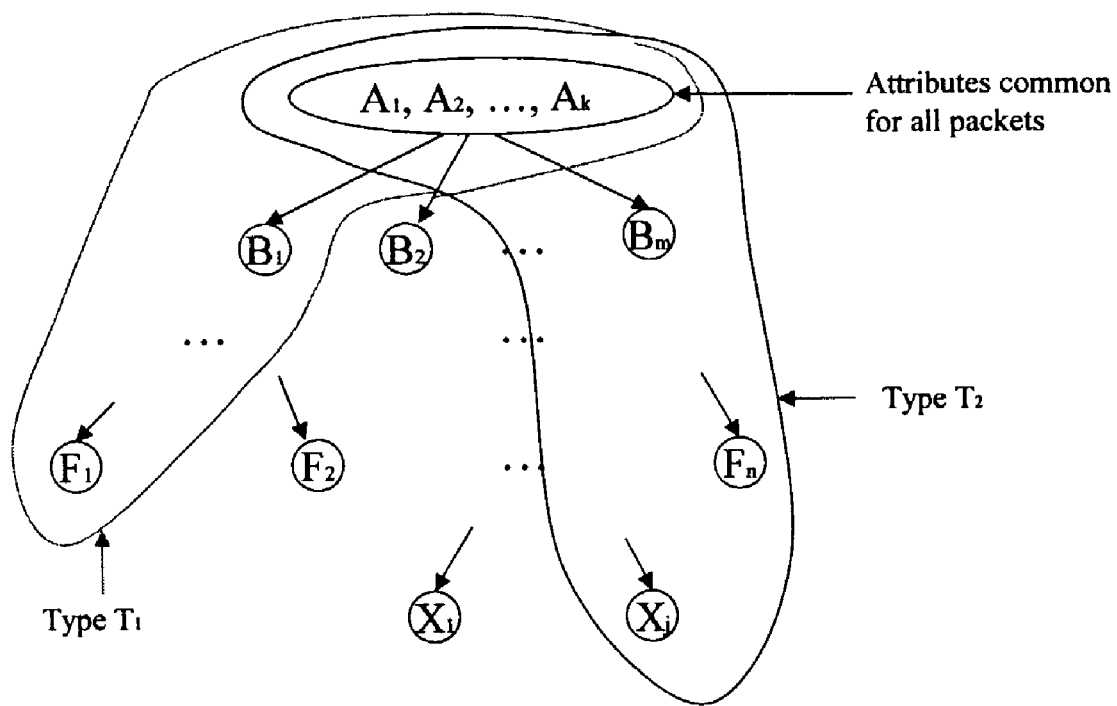
Figure 5: Different attributes and types

APPARATUS AND METHOD FOR AN OVERLOAD CONTROL PROCEDURE AGAINST DENIAL OF SERVICE ATTACK

FIELD OF THE INVENTION

The present invention relates generally to the field of communications networks, and more specifically to the field of prevention of distributed denial of service (DDOS) attacks in such networks.

BACKGROUND OF THE INVENTION

One threat faced by Internet and other networks is a distributed denial of service (DDOS) attack. In such an attack, a network device (commonly a server, i.e., a specialized computer used in an Internet-Protocol (IP)-based network) is bombarded with IP packets from many sources, in various forms including email, file transfers and so-called ping/UDP/ICMP floods, so that the network device (ND) is overloaded and rendered useless for normal operations. In order to limit and contain the damage of an attack, it is preferable for the network or a communications system within a network to decide intelligently on what packets to be dropped on-the-fly. Ideally, legitimate user packets should be kept while dropping abnormal/attacking packets.

Prior art methodologies for detecting and preventing DDOS attacks entailed storing and processing stored packets to determine potentially violating packets. A monitoring process which attempts to monitor and catalog every detail of every IP packet is quickly overwhelmed, however. Thus, to effectively prevent DDOS attacks, network processors must operate using a minimum number of states or traffic statistics in order to keep storage and computational requirements within a practical range. Accordingly, there is need for more efficient techniques for detecting, identifying and preventing DDOS attacks, wherein such steps can be accomplished essentially on-the-fly.

SUMMARY OF THE INVENTION

The present invention is a methodology to prioritize packets based on the conditional probability that given the values of attributes carried by packet, the packet is a legitimate one. We will call this the conditional legitimate probability of a packet from here onward. The conditional probability of each packet is evaluated based on Bayesian estimation technique. This is accomplished by comparing the attributes carried by an incoming packet against the "nominal" distribution of attributes of legitimate packet stream. Since an exact prioritization of packets based on their conditional legitimate probability would require offline, multiple-pass operations, e.g. sorting, we take the following alternative approach to realize an online, one-pass selectively dropping scheme. In particular, we maintain the cumulative distribution function (CDF) of the conditional legitimate probability of all incoming packets and apply a threshold-based selective dropping mechanism according to the conditional probability value computed for each incoming packet. To speed-up the computation of the conditional legitimate probability for each incoming packet, we may, as an alternative, use the logarithmic version of the equation to implement the Bayesian estimation process.

Other features of the invention include: providing means to guarantee minimum throughput of particular (pre-configured) type(s) of packets; providing a. Filtering Mechanism to suppress the noise during estimation/maintenance of nominal attributes distribution; applying state-of-the-art efficient algorithm/data-structures for quantile and histogram building/updates; using the proven, industrial-strength load-shedding algorithms as a submodule in the overload control algorithm; and being amenable to practical implementation to support online, one-pass processing on high-speed communication links.

One embodiment of a methodology in accordance with the present invention includes the steps of computing a probability measure of an incoming packet based on selected attributes included within said packet; adjusting a conditional legitimate probability value of the said packet; updating a conditional probability function of conditional probabilities of incoming packets; and performing a throttling decision as to whether or not to pass packets through said location.

Another embodiment of the invention includes the steps receiving packets at said location within said network; computing a conditional probability measure for each packet entering said location based on selected attributes included within said packet; periodically updating a cumulative distribution function based on previously computed conditional probability measures; determining a drop threshold based on access to said cumulative probability function; and passing packets that exceed said determined drop threshold to said location.

BRIEF DESCRIPTION OF THE DRAWINGS

A more complete understanding of the present invention may be obtained from consideration of the following detailed description of the invention in conjunction with the drawing, with like elements referenced with like references, in which:

FIGS. 3A, 3B and 3C are more detailed illustration of flow diagrams showing implementation of the present invention;

FIG. 5 is an exemplary graphic illustrating a portion of the load shedding algorithm discussed in the application.

DETAILED DESCRIPTION

The present invention provides for distributed, adaptive IP filtering techniques for detecting and blocking packets involved in a DDOS attack. Although the present invention may be utilized in a variety of applications or devices, the operation of the present invention will be described using specific embodiments (i.e., examples). The present invention envisions preventing the disablement of Internet network devices when an IP packet source(s) sends an inordinate amount of IP packets in an attempt to disable such devices.

Figure 1:
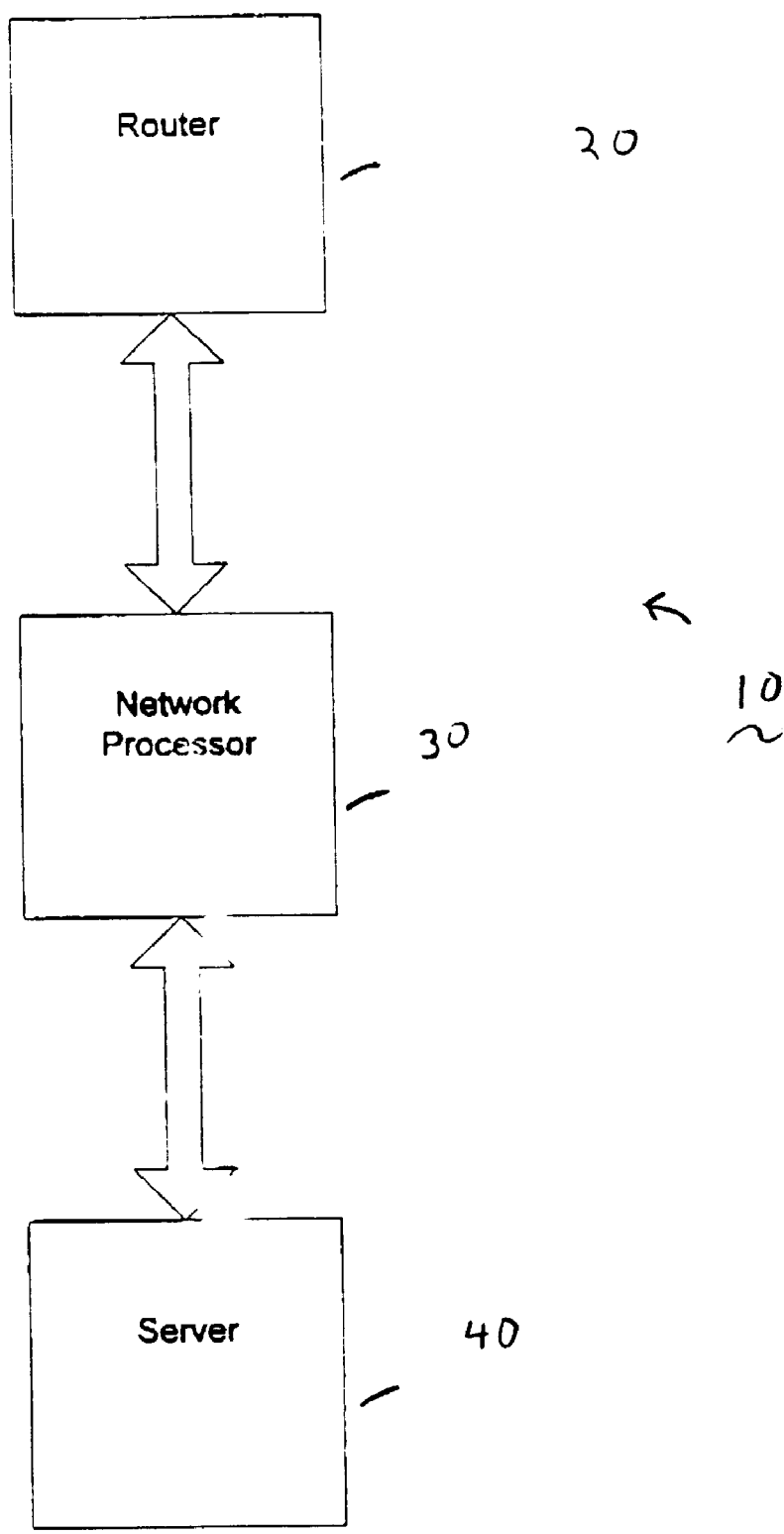
FIG. 1 is an illustration of an exemplary network configuration including the present invention.

In an exemplary embodiment of the present invention, a network processor (NP) is used to protect a network server from an overload of IP packets sent from a router. Referring now to FIG. 1, a NP 30 is shown within network 10. The network 10 also comprises at least one router 20 and at least one server 40. The NP 30 is adapted to detect and filter IP packets traveling, for example, from the router 20 to the server 40. IP packets come in various forms including email, file transfers, and ping/UDP/ICMP floods. Those skilled in the art will appreciate that NPs are generally capable of processing IP packets as fast as they can receive them at OC3 or above rates (i.e., at a rate of hundreds of thousands of packets per second).

It should be noted that although server 40, NP 30 and router 20 have been depicted as three units in FIG. 1, they may comprise fewer or additional units. As discussed previously, Internet traffic contains millions of various packets transmitting data for different purposes. Every packet can be classified by many attributes such IP source and destination addresses, port numbers, protocol type, packet size, etc.

In accordance with the present invention, it is assumed an incoming packet carries a set of discrete-valued attributes A, B, C denoted as (A,B,C, . . . ). Let $JP_n(A,B,C, ...)$ be the joint probability mass function of this set of attributes under normal traffic situation, i.e. without any hacker's attack. If we assume the attributes to be independent of each other, we will have:

$$JP_n(A=a, B=b, C=c, ...) = P_n(A=a) \cdot P_n(B=b) \cdot P_n(C=c) ...$$

where a, b and c, . . . are the particular values that the attributes A, B and C take, and $P_n(X)$ is the marginal probability mass function of packet attribute X under Normal (no attacker) conditions. Let us denote $JP_m(A, B, C, ...)$ as joint probability mass function of packet attributes measured from current incoming traffic, which may be normal or under attack. By assuming independence among different packet attributes, we can estimate $JP_m(A=a, B=b, C=c, ...)$ by $P_m(A=a) \cdot P_m(B=b) \cdot P_m(C=c) ...$ where $P_m(X=x)$ is the marginal probability of packet attribute X being equal to x, based on the current incoming traffic. The conditional legitimate probability of packet p can then be defined as, CP(p)=Prob(p is a legitimate packet| Attributes A, B, C, . . . of packetp are equal to $a_p$, $b_p$, $c_p$, . . . , respectively)

Assuming there are $N_m$ packets in total within a measurement interval among which $N_n$ packets are from legitimate sources, and $N_a$ packets are sent only to overload the system. We have:

$$CP(p) = \frac{N_n JP_n(A=a_p, B=b_p, C=c_p, ...)}{N_n JP_n(A=a_p, B=b_p, C=c_p, ...) + N_a JP_a(A=a_p, B=b_p, C=c_p, ...)}$$

$$= \frac{N_n JP_n(A=a_p, B=b_p, C=c_p, ...)}{N_m JP_m(A=a_p, B=b_p, C=c_p, ...)}$$

$$= \frac{\rho_n}{\rho_m} \cdot \frac{JP_n(A=a_p, B=b_p, C=c_p, ...)}{JP_m(A=a_p, B=b_p, C=c_p, ...)}$$

Eq. (1)

where $N_n$=total number of legitimate, i.e. normal, packets over a certain observation interval;

$N_a$=total number of attack packets over a certain observation interval;

$N_m$=total number of packets over a certain observation interval=$N_n+N_a$;

$\rho_m$=current measured utilization of the system;

$\rho_n$=nominal/baselined utilization of the system (at a specific time-of-the-day, day-of-the-week, etc)

$P_a(A, B, C, ...)$ is the joint probability mass function of header attributes of attacking traffic.

In Eq. 1, we estimate $N_n|N_m$ by $\rho_n|\rho_m$;

If we further assume independent distribution across different attributes, we have:

$$CP(p) = \frac{\rho_n}{\rho_m} \cdot \frac{P_n(A=a_p)}{P_m(A=a_p)} \cdot \frac{P_n(B=b_p)}{P_m(B=b_p)} \cdot \frac{P_n(C=c_p)}{P_m(C=c_p)}$$

Eq. (2)

Once CP(p) is computed for each incoming packet, it will be used as a key decision metric for the acceptance/dropping of the packet. In particular, CP(p) of a packet is compared to a dynamically adjusted threshold. Notwithstanding other additional "immunity rules" (which will be discussed herein), a packet p will be dropped if its conditional legitimate probability CP(p) is less than the dynamically adjusted threshold value. This threshold is computed/updated based on an ongoing cumulative distribution function (CDF) of the legitimate probabilities of the incoming packets.

Alternatively, we can take the logarithm of both sides of Eq.(2) to yield:

$$\log(CP(p)) = [\log(\rho_n) + \log(P_n(A=a_p)) + \log(P_n(B=b_p)) + \log(P_n(C=c_p)) + ...] - [\log(\rho_m) + \log(P_m(A=a_p)) + \log(P_m(B=b_p)) + \log(P_m(C=c_p)) + ...]$$

Eq. (3)

The use of Eq.(3) instead of Eq.(2) can facilitate the real-time computation of CP(p) of a packet p by avoiding numerous floating-point multiplication/division operations in Eq.(2). Notice that only the addition/subtraction operation is required for Eq.(3) where the logarithm function can be implemented in form of simple table lookup. In this case, we would maintain the ongoing CDF of log(CP(p)) of the incoming packets for establishing the dynamically adjusted threshold on log(CP(p)).

As would be understood, one should wary of Boundary cases where $P_m(X=x)$=zero, it such cases, some minimum value, say minval, is assigned to $P_m(X=x)$.

Also some noise filtering mechanism for obtaining "stable" Pn( ) and Pm( ) estimates can be considered. First, we have to ensure that some minimum number of incoming packets have to be observed/measured before Pn( ) and Pm( ) estimates are considered stable. Second, the values of Pn( ) and Pm( ) can be updated in an exponential moving average manner so as to filter out short-term, high-frequency, fluctuations in Pn( ) and Pm( ).

Other additional filtering mechanisms can be applied on Pm( ) and Pn( ) in order to reduce/control the impact of the short-term fluctuations in their estimates on CP( ). For instance, in the case where Eq. 2 is used to compute CP( ), we can choose to include an attribute X in CP( ) computation based on Eq. 2 only if the difference between Pm(X) and Pn(X) is significant, i.e. if {Pn(X)/Pm(X)} ratio is bigger than some preset threshold, say thd1, or the ratio is less than 1/thd1.

Overload Control Algorithm

Figure 2:
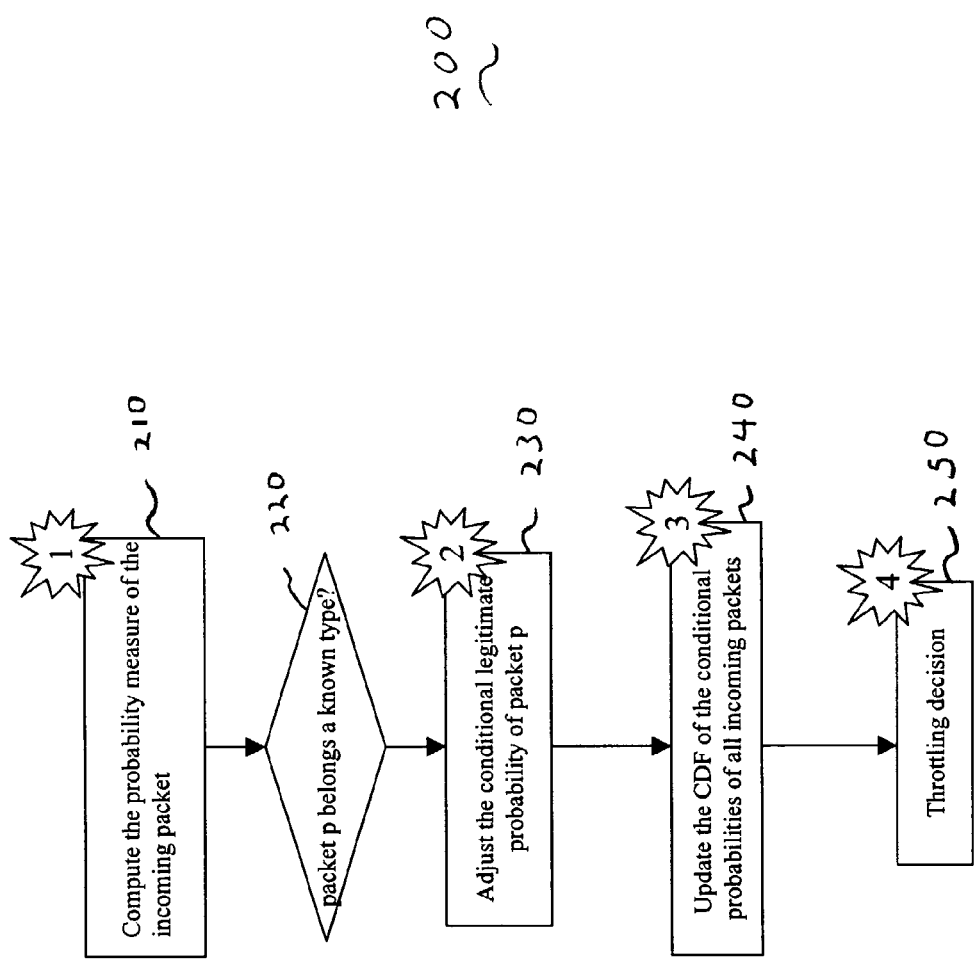
FIG. 2 is an illustration of an exemplary high level flow diagram showing implementation of the present invention overload control procedure.

Referring to FIG. 2, a high level flow diagram 200 of the overload control algorithm of the present invention is shown. Each of the main steps shown in FIG. 2 is described in greater detail herein. A first general step as shown in box 210 of FIG. 2 is to compute a probability measure for each incoming packet as was described with respect to Eq. 1 and 2 above. Next, in box 220, a decision is made as to whether an incoming packet, p, is a known type. If so, the conditional legitimate probability of the packet is determined (box 230). Next, in box 240, a conditional probability distribution function is updated for all the incoming packets. In box 250, a throttling decision, e.g., whether to admit or drop the packet, is made based on the computed probability measure and the updated CDF function. What follows is a detailed description of one embodiment of an overload control algorithm in accordance with the present invention. The functions and variables to be used in the algorithm are given in Table 1 below.

TABLE 1

Functions and variables

Functions

| | |
|---|---|
| CDFupdate(CDF,Pcond) | Update a CDF given the CP of an incoming packet; CDF = CDF to be updated; Pcond = x-axis value = CP(incoming packet). |
| invCDF(CDF,fraction) | Given a fraction value, i.e. along the y-axis of the CDF, lookup its corresponding percentile. |
| CDFAll | CDF of the CP( ) values (after potential adjustment) of all incoming packets. |
| CDFTypeX | CDF of the CP( ) values (without potential adjustment) of incoming packets belonging to TypeX. Type refers to a certain set of attributes at a given set of parameter values. The CDF expansion is applied to the types, to which the packets belong need certain degree of immunity. A detailed illustration on a particular type is given in the Appendix. The relation between CDFAll and CDFTypeX is also explained in the Appendix. Under different constraints, we may have more than one type that requires some (x) percentage of immunity. Immunity means at least x percent of the packets of the particular type must pass through the system. |

Variables

| | |
|---|---|
| percentile | =invCDF(CDF,fraction) |
| BW_m_TypeX | current measured throughput for Type X packets |
| BW_min_TypeX | Minimum throughput desired for Type X packets |
| $\rho_m$ | current measured loading of the system |
| $\rho_n$ | nominal loading of the system (can be as a function of time-of-the-day, day-of-the-week, etc) |
| $\rho_{m\_all}$ | Target maximum utilization of the system |
| $\rho_{max\_all}$ | Current measured utilization of the system |
| CPAdjustment | The boolean variable for flagging of immunity grant. Initial value: FALSE |
| Frac_Thd_TypeX | Fraction of Type X packets which should be granted "immunity" in order to guarantee some minimum throughput of this type of packets. This should be those who have higher CP( ) values. |

Figure 3A:
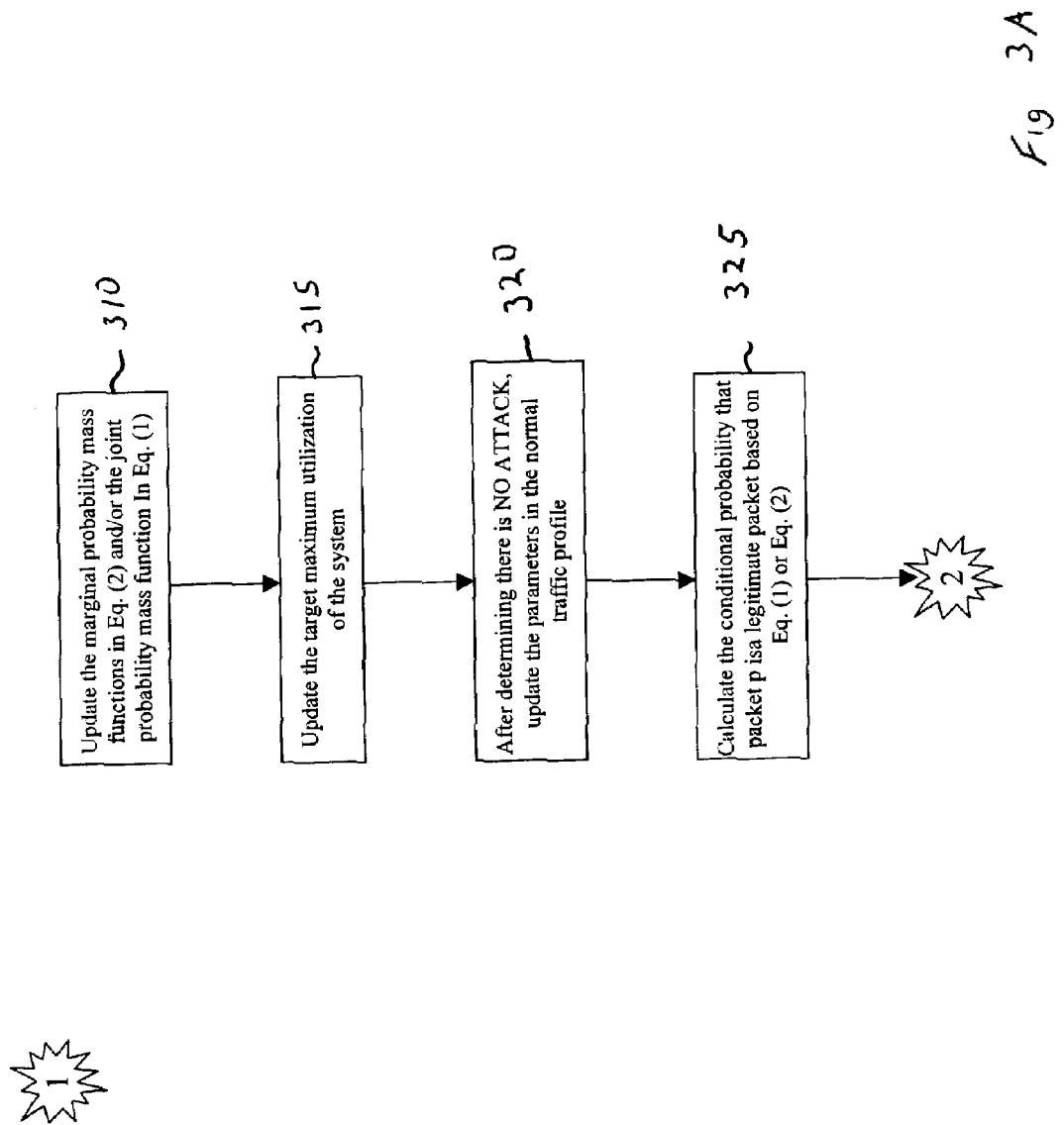

Operations on each incoming packet p:

Referring to FIGS. 3A, 3B and 3C in connection with the following discussion, a detailed step-by-step description of the procedure for implementing the present invention overload control algorithm invention is presented. It should be noted that Step 1-Step 4 below are for calculation of the conditional probability given in Eq. (1) and/or Eq. (2).

1. A first step in the procedure 310 is to update the marginal probability mass functions $P_m(A), P_m(B), P_m(C), \ldots$ if Eq. (2) is used to calculate the conditional probability CP(p), and/or update the joint probability mass function $JP_m(A, B, C, \ldots)$ based on attributes carried by p, if Eq. (1) is used;

Note that in order to adaptively update the probabilities $P_m(A), P_m(B), P_m(C), \ldots$ and $P_m(A, B, C, \ldots)$, a sliding window mechanism is used. We will need to determine the appropriate noise-filtering/smoothing mechanisms, e.g. sliding window-size, step-size, etc, in order to obtain robust distributions of $P_m(A), P_m(B), P_m(C), \ldots$ and $P_m(A, B, C, \ldots)$.

2. In a next step 315, update $\rho_{m\_all}$, which is required for calculation CP(p) in Eq. (1) or Eq.(2).

3. After it has been determined that there is no significant change in the incoming traffic characteristics, i.e. confirm that NO ATTACK is in progress, we may also update the normal profile $\rho_n$ (step 320), $P_n(A), P_n(B), P_n(C), \ldots$ and/or $JP_n(A,B,C, \ldots)$ according to attributes of packet p.

There are various existing mechanisms for determining if there is attack, as would be understood by persons skilled in the art. One exemplary method for determining an attack is described in Flash Crowds and Denial of Service Attacks: Characterization and Implications for CDNs and Web Sites Jaeyeon Jung, Balachander Krishnamurthy, and Michael Rabinovich (AT&T Labs-Research) WWW 11—The Eleventh International World Wide Web Conference, Honolulu, Hi., May 2002, the contents of which are incorporated by reference herein. In this proposal, we will not focus our discussions on any particular mechanism. The process of determining if there is an ongoing attack is simply viewed as a black box here.

Due to the potentially large number of attributes as well as that of the possible values of each attributes, more efficient data structures may be required for the maintenance of the marginal and the joint probability mass functions of the attributes described above. In particular, instead of keeping track of /maintaining the complete marginal/joint probability mass functions, i.e. histograms, we may, instead, maintain the "iceberg-style" histograms using techniques similar to those described in G. S. Manku, "Approximate Frequency Counts over Data Streams", in Proceedings of the 28th VLDB Conference, Hong Kong, China, August 2002, tehcontents of which are incorporated by reference. By "iceberg-style", it means that the histogram will only include those entries in the population which appear more frequently than a preset percentage threshold. In other words, entries which are absent from an iceberg-style histogram can be safely assumed to have their probability mass below the preset percentage threshold. The use of iceberg-style histogram is particularly important for the case of joint probability mass function due to its vast input dimensions.

4. In the next step 325, based on 1-3, compute CP(p), i.e. the conditional probability that p is a legitimate packet based on Eq. 2 (or Eq. 1 at the expense of additional complexity of keeping track of the joint probability distribution functions).

Note: In addition, one can also maintain the normal attribute distribution as well as CDF of the conditional legitimate probability for a particular subset of packets, CP_TypeX(p) where type X refers to this particular type/subset of packets, e.g. HTTP packets. By tracking the normal/current attribute distributions for different types of packets separately, i.e. Pm,x( ), Pn,x( ) or JPm,x( ), JPn,x( ), one would be able to further enhance the accuracy of the Bayesian estimation for CP at the expense of additional computational complexity and storage requirement.

5. In a next series of steps (220 from FIG. 2), which may or may not be performed, it is determined if packet p belongs to some pre-determined sub-type of packets, say, Type X, perform the following:

a) Referring to FIG. 3B, update the current measured throughput for Type X packets (BW_m_TypeX); this measures current offered load of Type X packets (step 330);

b) In step 335, update the CDF of the conditional probability of packets with type X; CDFupdate(CDFTypeX, CP(p));

c) Calculate the fraction of Type X packets which should be granted "immunity" in order to guarantee some minimum throughput of Type X packets (step 340). This is defined as the ratio of the minimum throughput desired for Type X packets and the current measured throughput for Type X packets (Frac_Thd_TypeX=BW_min_TypeX/BW_m_TypeX).

d) In step 340, look up the conditional probability threshold based on Frac_Thd_TypeX calculated above, i.e., we should grant immunity to type X packets whose CP( ) value>=Immu_CP_Thd_TypeX, where Immu_CP_Thd_TypeX=invCDF(CDFTypeX, 1−Frac_Thd_TypeX);

e) If CP(p1)>=Immu_CP_Thd_TypeX, CPAdjustment=TRUE (step 345);

f) If there are other pre-determined sub-types which packet p belongs to, GOTO STEP 5 (330). Otherwise, continue to 5 g) (350).

g) If CPAdjustment=TRUE, CP(p)+1→CP(p); This operation grants immunity to packet p;

The objective of STEP 5 is to be able to guarantee preset minimum throughput for some pre-selected type of packets. This is via the granting of immunity to a preset portion of such pre-determined special types of packet even if they have a very small conditional legitimate probabilities. Immunity is granted by explicitly inflating the CP( ) of a packet in STEP 5 g).

6. If p belongs to some known type of attack packets, then set CP(p)=0.0 (step 355);

In some scenarios, assuming additional information is known about the packets, we can then decide if they belong to the known type attack packets.

Figure 4:
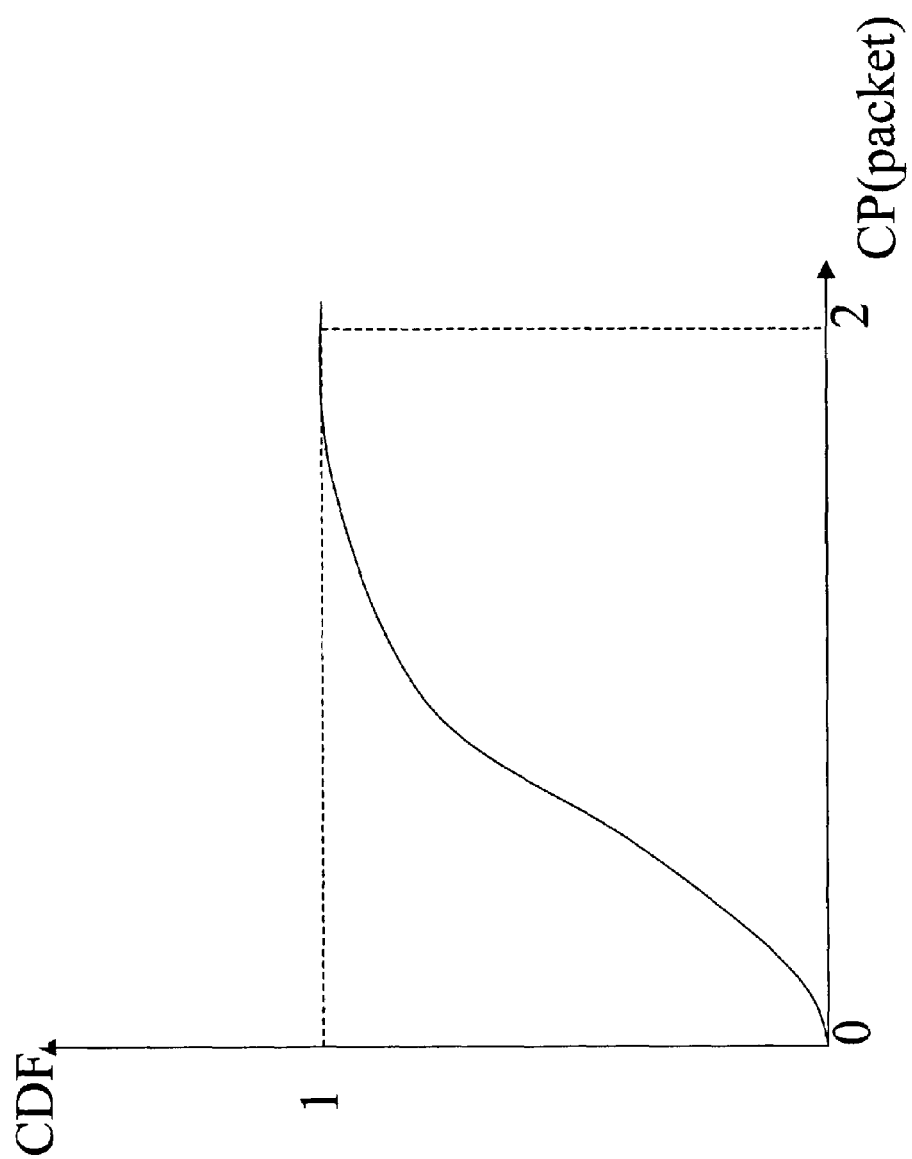
FIG. 4 is an exemplary graphic of conditional probability distribution function according to the present invention.

7. In step 360, update the CDF of the CP( ) values of all incoming packets (CDFAll) ONLY AFTER CP(p) has been potentially adjusted; CDFupdate(CDFAll,CP(p1)). An exemplary conditional probability distribution function (CDF) in accordance with the present invention is shown in FIG. 4;

8. In step 365, look up the conditional probability threshold based on $\psi$ for all the packets. CP_Drop_Thd=invCDF (CDFAll, 1−$\psi$), where $\psi$ is the fraction of current traffic we need to KEEP in order to reduce the system load; The value of $\psi$ is updated adaptively in every measurement interval by an existing overload control algorithm as described in J. Kaufmann, "A New Traffic Overload Control for the Autoplex Series II Cell—Work Project No. 170211-2200", Technical Memorandum, Bell Labs, Lucent Technologies, Feb. 25, 1999, the contents of which are incorporated by reference, and as described in the next section. It would be understood, however that other load shedding algorithms may also be utilized.

9. If (CP(p)<CP_Drop_Thd) where CP_Drop_Thd is determined in Step 8, drop packet p; otherwise, packet p will pass through the system; this is the throttling decision of FIG. 2 (250).

The CDFupdate(,) and invCDF(,) functions/operations mentioned above can be efficiently implemented in an online, one-pass manner using recent data-stream mining techniques similar to those described, for example, in M. Greenwald, S. Khanna, "Space-Efficient Online Computation of Quantile Summaries", in Procs. of the 2001 ACM SIGMOD Intl. Conference on Management of Data, pp. 58-66, Santa Barbara, Calif., May, 2001; Fei Chen, Diane Lambert and Jose C. Pinheiro, "Incremental Quantile Estimation for Massive Tracking", in the Proceedings of the Sixth International Conference in Knowledge Discovery and Data Mining, 2000; Anna C. Gilbert et al, "How to Summarize the Universe: Dynamic Maintenance of Quantiles", in Proceedings of the 28th VLDB Conference, Hong Kong, China, August 2002; M. Datar et al, "Maintaining Stream Statistics over Sliding Windows", in the Procs. of Thirteenth Annual ACM-SIAM Symposium on Discrete Algorithms (SODA'02), 2002 and B. Babcock et al, "Sliding Window Computations over Data Streams", Technical report, Department of Computer Science, Stanford University, April 2002, the contents of each of the above references being incorporated herein by reference. This is done, for example, by maintaining the quantile estimation of the value of interest, i.e. the adjusted CP(p) or log(CP(p)) in our case, over a sliding window of incoming packets.

Exemplary Load Shedding Algorithm

For the sake of completeness, we describe below the load-shedding algorithm by Joe Kaufmann. This algorithm is used as a sub-module on the current invention. In particular, it is used for determining \psi ($=\psi_i$) by comparing the rho_m_all parameter against the rho_max_all parameter in the pseudo-code.

Let $\psi_i$ denote the fraction of packets permitted to pass the throttle points during the $(i+1)^{st}$ interval. Let $\psi_0=1$ and $\psi_i$ will always be constrained to lie in the interval $[\psi_{min},1]$, where $\psi_{min}$ is a small but non-zero number which prevents the throttle from shutting off all incoming packets. At the end of the i th measurement interval, $\hat{\rho}_i$ (the utilization estimate during the i th interval) is available, and we calculate $$\phi_i = \frac{\rho_{max}}{\hat{\rho}_i},$$

where $\rho_{max}$ is the maximum core utilization defined by the server. If $\hat{\rho}_i=0$, we set $\phi_i=\phi_{max}$ where $\phi_{max}$ is a large number whose precise value is unimportant. $\rho_{max}$ is chosen to permit the serve to maintain a reasonable delay for all incoming packets. With $\phi_i$ calculated, the throttle to be in the next $(i+1)^{st}$ interval, denoted by $\psi_i$ is given by:

$$\psi_i = \psi_{i-1}\phi_i \qquad \text{Equation 4}$$

Since $\psi_i$ must be truncated to lie in the interval $[\psi_{min},1]$, we can rewrite the above as follows:

$$\psi_i = \max\{\min\{\psi_{i-1}\phi_i, 1\}, \psi_{min}\} = \max\left\{\min\left\{\psi_0\prod_{j=1}^{i}\phi_j, 1\right\}, \psi_{min}\right\}$$

Note that $\psi_i$ can be write as $$\psi_0\prod_{j=1}^{i}\phi_j,$$

which shows that the throttle adjusts rather quickly to all changes in the offered load.

The overload control algorithm given above is applied to the expanded CDFAll to determine the threshold of the conditional probability to drop packets.

As shown in FIG. 5, a type is a subset of all the packets which share a certain set of attributes in addition to those common attributes shared by all the packets. In this paper, we define CDFAll as the CDF of the conditional probability that a packet belongs to the normal traffic, given the common set of attributes, i.e., Prob(a packet is a legitimate (non-attacking) one| values of attributes A1, A2, . . . , Ak). On the other hand, CDFTypeT1 refers to the CDF of the conditional probability that a packet belongs to the normal traffic, given all the attributes in that particular type, i.e., Prob(a packet is a legitimate (non-attacking) one| values of attributes A1, A2 , Ak, B1, . . . , F1).

The foregoing description merely illustrates the principles of the invention. It will thus be appreciated that those skilled in the art will be able to devise various arrangements, which, although not explicitly described or shown herein, embody the principles of the invention, and are included within its spirit and scope. It would also be understood that a delegate port card need not be embodied in a separate physical card, but that only a separate distributed processing functionality be present. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

Appendix I

Corresponding Pseudo-code

Operations on each incoming packet p1:
----------------------------------- update individual marginal probability mass function Pm()'s and/or the joint probability mass function JPm(A,B,C,...) for the attributes carried by p1 ;

update rho_m_all ;
/* Need to determine the appropriate noise-filtering/ smoothing mechanisms, e.g. sliding window-size,
      step-size, etc, in order to obtain robust distributions of Pm()'s and JPm(A,B,C)
*/
/*There are various existing mechanisms for determining if there is attack. In this proposal, we will not focus our discussions on any particular mechanism. The process of determining if there is attack can be simply viewed as a black box here.*/

/**********

After it has been determined that there is no significant change in incoming traffic characteristics,
      i.e. confirm that NO ATTACK is in progress,
      we should also update rho_n and Pn()'s and JPn(A,B,C,...)

according to attributes of p1.

************/

Compute CP(p1) ;   // i.e. the conditional probability that p1 is a legitimate packet
                          based on [Eq.1] and/or [Eq.2] ;

```
CPAdjustment = FALSE ; /* initialize the boolean variable for
flagging of immunity grant */ foreach special type, say Type X, of packets do { if (p1 belongs to Type X ) { update BW_m_TypeX ; /* measure current offered load of Type X
packets */

CDFupdate(CDFTypeX,CP(p1)) ; /* update CDF of conditional prob.
of type X packets */

Frac_Thd_TypeX = BW_min_TypeX / BW_m_TypeX ;

/* Frac_Thd_TypeX = fraction of Type X packets which should be
granted "immunity" in
           order to guarantee some minimum throughput of this type of
packets. This should
           be those who have higher CP() values */

Immu_CP_Thd_TypeX = invCDF(CDFTypeX, 1 - Frac_Thd_TypeX) ;
        /* lookup the conditional probability threshold based on
Frac_Thd_TypeX,
           i.e. we should grant immunity to type X packets which have a
CP() value >= Immu_CP_Thd_TypeX
        */ if ( CP(p1) >= Immu_CP_Thd_TypeX )
            CPAdjustment = TRUE ;

} // if p1 belongs to Type

} // for the next special type of packets if (CPAdjustment == TRUE )
        CP(p1) += 1.0 ;   /* grant immunity to this packet */

For each known BAD type of packets do { if (p1 belongs to known BAD type)
            CP(p1) = 0.0 ;

} // foreach known BAD type of packets
/*How do we decide about the known BAD type?  In some scenarios, assuming
additional information is known about the packets, we can then decide if they
belong to the known BAD type.*/

CDFupdate(CDFAll,CP(p1)) ; /* update CDFAll ONLY AFTER CP(p1) has
been potentially adjusted */

CP_Drop_Thd = invCDF(CDFAll, 1 - \psi) ;
  /* \psi is the fraction of current traffic we need to KEEP in order
to reduce the system load ;
     \psi is determined elsewhere by Joe's alg. */ if ( CP(p1) < CP_Drop_Thd )
        drop p1 ;
```

What is claimed is:

1. A method of determining packets to be dropped in regard to a potential denial of service attack at a location within a packet network, said method comprising the steps of:
    receiving packets at said location within said network;
    computing a conditional probability measure for each packet entering said location based on selected attributes included within said packet;
    periodically updating a cumulative distribution function based on previously computed conditional probability measures;
    determining a drop threshold based on access to said cumulative distribution function;
    passing packets that exceed said determined drop threshold to said location.

2. The method of claim 1, wherein said step of computing a conditional probability measure further includes the steps of updating an individual marginal probability mass function and a joint probability mass function for attributes carried by each said packet.

3. The method of claim 1, further including the step of filtering said conditional probability measure to ensure stable estimates thereof.

4. The method of claim 3, wherein said filtering is selected from the group consisting of sliding window and step-size filtering.

5. The method of claim 1, further including the step of determining whether said packet is believed to be an attacking packet prior to updating said cumulative distribution function.

6. The method of claim 1, further including the step of granting immunity to packets of a specified sub-type entering said location.

7. The method of claim 1, wherein said conditional probability measure is computed in accordance with the following equation:

$$CP(p) = \frac{(N_n JP_n(A = a_p, B = b_p, C = c_p, ...))}{\begin{pmatrix} N_n JP_n(A = a_p, B = b_p, C = c_p, ...) + \\ N_o JP_u(A = a_p, B = b_p, C = c_p, ...) \end{pmatrix}} =$$

$$\frac{N_n JP_n(A = a_p, B = b_p, C = c_p, ...)}{N_m JP_m(A = a_p, B = b_p, C = c_p, ...)} =$$

$$\frac{\rho_n}{\rho_m} \cdot \frac{JP_n(A = a_p, B = b_p, C = c_p, ...)}{JP_m(A = a_p, B = b_p, C = c_p, ...)}$$

where:
    $N_n$=total number of legitimate, i.e. Normal, packets over a certain observation interval;
    $N_o$=total number of attack packets over a certain observation interval
    $N_m$=total number of packets over a certain observation interval $=N_n+N_o$;
    $\rho_m$=current measured utilization of the system;
    $\rho_n$=nominal/baselined utilization of the system (at a specific time-of-the-day, day-of-the-week, etc);
    $JP_n(A,B,C, ...)$ is the joint probability mass function of this set of attributes under normal traffic situation;
    $JP_m(A,B,C, ...)$ is the joint probability mass function of packet attributes measured from current incoming traffic, which may be normal or under attack;
    $JP_a(A, B,C, ...)$ is the joint probability mass function of this set of attributes under attack situation; and
    a, b and c, ... are the particular values that the attributes A, B and C take.

8. The method of claim 1, wherein said conditional probability measure is computed in accordance with the following equation:

$$CP(p) = \frac{\rho_n}{\rho_m} \cdot \frac{P_n(A = a_p)}{P_m(A = a_p)} \cdot \frac{P_n(B = b_p)}{P_m(B = b_p)} \cdot \frac{P_n(C = c_p)}{P_m(C = c_p)}$$

where:
    $\rho_m$=current measured utilization of the system;
    $\rho_n$=nominal/baselined utilization of the system (at a specific time-of-the-day, day-of-the-week, etc);
    $P_n(A, B,C, ...)$ is the probability mass function of this set of attributes under normal traffic situation;
    $P_m(A, B,C, ...)$ is the probability mass function of packet attributes measured from current incoming traffic, which may be normal or under attack; and
    a, b and c, ... are the particular values that the attributes A, B and C take.

9. The method of claim 1, wherein said drop threshold is calculated using a load shedding algorithm.

10. The method of claim 2, wherein said joint and marginal probability functions are maintained using iceberg style histograms.

11. A method of determining packets to be dropped in regard to a potential denial of service attack at a location within a packet network, said method comprising the steps of:
    receiving packets at said location within said network;
    computing a probability measure of an incoming packet based on selected attributes included within said packet;
    adjusting a conditional legitimate probability value of said packet;
    updating a conditional probability function of conditional probabilities of incoming packets; and
    performing a throttling decision as to whether to drop or pass packets through said location.

12. The method of claim 11, wherein said step of computing a probability measure includes the steps of:
    updating a probability mass function for said packet;
    updating a target maximum utilization measure;
    updating parameters in a normal traffic profile if it is determined that no attack is in progress; and
    calculating a conditional probability that a packet is a legitimate packet based on said probability mass function.

13. The method of claim 11, wherein said step of adjusting a conditional probability function includes the steps of:
    updating the current measured throughput for a specified type of packet;
    updating a conditional probability distribution function of said specified type of packet;
    calculating a fraction of said specified type of packet to be granted immunity;
    determining a conditional probability threshold based on said calculated fraction;
    adjusting the conditional probability distribution function if said conditional probability of said packet is greater than said conditional probability threshold.

14. The method of claim 11, wherein said step of updating a conditional probability function includes the steps of:

adjusting the conditional probability function if said packet belongs to a known type of attack packet;

updating the conditional probability function or conditional probability values of all incoming packets after the conditional probability for said packet has been potentially adjusted; and determining a conditional probability threshold based on a fraction of current traffic needed to be kept to reduce a system load.

15. An apparatus for determining packets to be dropped in regard to a potential denial or service attack at a location within a packet network, said apparatus comprising:

means for receiving packets at said location within said network;

means for computing a probability measure of an incoming packet based on selected attributes included within said packet;

means for adjusting a conditional legitimate probability value of said packet;

means for updating a conditional probability function of conditional probabilities of incoming packets; and means for performing a throttling decision as to whether or not to pass packets through said location.

* * * * *